Sept. 22, 1959     V. O. OLSON     2,905,491

TURNBUCKLE

Filed Jan. 2, 1958

INVENTOR.
VERL O. OLSON.

BY

ATTORNEY.

United States Patent Office 2,905,491
Patented Sept. 22, 1959

2,905,491

TURNBUCKLE

Verl O. Olson, San Diego, Calif., assignor to General Dynamics Corporation, San Diego, Calif., a corporation of Delaware Application January 2, 1958, Serial No. 706,822

4 Claims. (Cl. 287—61)

This invention relates to turnbuckles and more particularly to turnbuckles having desired design requirements for connecting and adjusting ball end connectors for use in aircraft and missile applications.

Turnbuckles are well known as a means for connecting cables and rods and as a means for tightening or adjusting tension on connectors. There are many types of widely used turnbuckles and its field of development is considered to be in a crowded art. However, none of these known to this inventor have all the advantages of the present invention.

The turnbuckle comprising the present invention resulted in attempting to solve problems that could not have been solved otherwise. In aircraft and missile applications a prime consideration is that structures have a high strength to weight ratio. This is true not only with turnbuckles used but all structures. Thus, instead of using a big thick heavy panel to serve a particular purpose, several small spaced light weight panels might be used. With their weight already reduced to the minimum allowable for the desired strength, any additional openings therein will tend to further reduce their strength and weaken the overall structure. Consequently, any openings to permit cable passage must of necessity be as small as possible. With the use of multiple spaced panels, turnbuckles connecting cables or rods passing therethrough are limited in their travel, and of course in applications where cable movement requires turnbuck passage through a panel, the turnbuckle itself must be as small as possible. Military and aviation authorities require that all turnbuckles, to be acceptable, possess sufficient strength and holding power so that under test the cable or rod to which it is connected will fail before the turnbuckle does. Thus, the turnbuckle itself will never be the weakest link in the overall combination. Lock means to prevent disengagement of threaded connections has been a standard safety precaution for some time. Additional desired features include the protection of threaded connections during storage, assembly and use. Ease and convenience in their assembly and disassembly is also a desirable turnbuckle feature. These and other advantages are found in the turnbuckle comprising the present invention which consists of a rotatable internally threaded barrel and a pair of engageable externally threaded nuts. The nuts each have longitudinally extending apertures of two diameters connected by a tapered shoulder. A slot along the length of the nut permits its insertion over a cable or rod at any point as well as by passage over its end. Although this may be thought to have a weakening effect on the nut, the overall strength of the turnbuckle is not impaired due to the degree of taper of the nut shoulder and its proper positioning intermediate the external threaded area of the nut, a non-expanding reinforcement on the ends of the barrel and the use of an aperture engaging sleeve on the cable inwardly of the balled end. The balled end of the cable fits the larger diameter of the nut aperture and engages the tapered shoulder. Flats on the outer ends of the nuts and on the central portion of the barrel permit use of conventional tools for tightening and adjusting. Suitable holes are formed in the various parts for insertion of safety wire to prevent accidental unthreading of the parts. Inspection holes are provided in the barrel to insure proper thread adjustment.

It is therefore an object of this invention to provide for an improved turnbuckle.

Another object is the provision of a turnbuckle which is easy to assemble, disassemble and interchange.

Another object is the provision of a turnbuckle having a high strength to weight ratio and which is relatively small and compact in design.

Another object is the provision of a turnbuckle which may be connected to the end of a cable after the cable has been installed.

Another object is the provision of a turnbuckle having slotted nuts to permit ready connection and disconnection with ball ended cables and rods.

Other objects and features of the present invention will be readily apparent to those skilled in the art from the following specification and appended drawings wherein is illustrated a preferred form of the invention, and in which.

Figure 1:
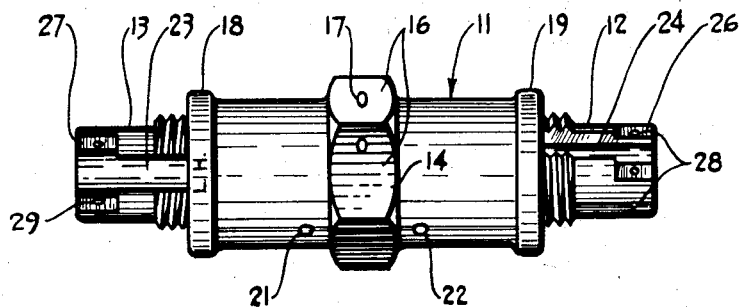
Figure 1 is an elevational view of the turnbuckle.

Referring now to Figure 1 there is shown a turnbuckle comprising a barrel 11 and two externally threaded nuts 12 and 13. The barrel is substantially cylindrical in shape with a central portion 14 of its outer surface having a plurality of flats 16 thereon so that the barrel may be rotated for positioning and adjusting purposes with a conventional wrench. With the flats centrally positioned, equal torsion is applied at both ends of the barrel. An aperture 17 interconnecting adjacent flats permits insertion of safety wire in locking the assembly when adjustment is completed. The ends 18, 19 of the barrel have enlarged outer surfaces to provide for a greater thickness of the barrel wall to give it additional strength and rigidity.

Apertures 21, 22 suitably positioned from the ends of the barrel permit inspection to determine if the nuts 12, 13 have been inserted to the proper depth. This may be done by inserting a small wire or pointed object into the apertures and if the wire will go in only a depth equal to the wall thickness, the end of the nut has passed that point and has the necessary length of threaded engagement with the barrel.

Both of the externally threaded nuts 12, 13 have an elongated slot or groove 23, 24 for a purpose to be hereinafter explained. The outer ends of the nuts have suitable flats 26, 27 thereon to permit rotation and adjustment with conventional wrenches. Suitable apertures 28, 29 at the ends and projecting through flats 26, 27 permit insertion of safety wire in locking the assembly when adjusted. The safety wire passes through apertures 28 on one nut 12, aperture 17 on barrel 11 and apertures 27 on nut 13 to prevent relative rotation of the parts and/or to show that proper adjustment has been made and to prevent accidental disengagement or relative rotation of the parts. Safety wire appearing on the flats prevents the operator from inadvertently attempting to make an adjustment without first removing the wire since the wire passes over at least a portion of the flats upon which a wrench must be inserted. This reminder is also present by the positioning of safety wire through aperture 17 in flats 16 of the barrel.

The outer end of the nuts have the threads removed a preselected distance so that the threaded portion is substantially flush with the end of the barrel when the nut has been inserted so that its inner end is flush with the inspection apertures. This provides a sight check as to whether a proper threaded engaging surface between the nut and barrel has been achieved to insure sufficient strength of the union. Of course the nut may be inserted further for adjustment purposes as desired. Since the barrel must be threaded in opposite directions at either end to accommodate left and right hand threads (so that both ends will tighten or loosen together upon barrel rotation), the initials "LH" appear on the barrel end having the left hand threads.

Figure 2:
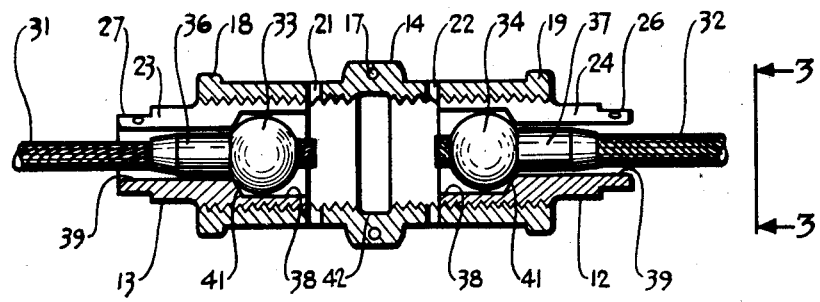
Figure 2 is a longitudinal cross-sectional view of the assembly with parts in elevation.

Figure 2 shows a cross-sectional view of the turnbuckle with the cables inserted. Here cables 31, 32 have ball ends 33, 34 thereon installed in a conventional manner, such as by crimping, welding or other well-known techniques. Inwardly of the ends are sleeves 36, 37 which may be an integral part of the ball portion or may be separately and independently attached to the cable. The ball ends 33, 34 are received by a first portion 38 of larger diameter of a bore in nuts 12, 13 and the sleeves 36, 37 are received by a second portion 39 of smaller diameter. The ball ends and sleeves are of such size relative to the diameters of these bore surfaces that the ball ends and sleeves would oppose any force that would tend to collapse the nuts which would otherwise result in the width of the slot 23, 24 becoming narrowed and the threads on the nut being urged inwardly from the turnbuckle threads to weaken the threaded engagement of the union. The larger and smaller inner bore surfaces 38, 39 of the nuts 12 and 13 are joined by a tapered shoulder 41. This shoulder is tapered approximately 60 degrees from the inner bore surfaces. Thus as the tension on the cables becomes progressively greater, the ball end abuts the tapered surface as a positive stop for the ball. The ball is urged into tighter gripping relationship with the cable and the nut is urged outwardly into even tighter threaded relationship with the threads of the barrel to provide an even greater gripping effect of the threaded union. The enlarged ends 18, 19 of the barrel 11 provide enough rigidity so that the barrel itself will not also become enlarged at the ends by the outward expansion of the nut. It should be noted that outward force on the nut initiated from shoulder 41 will appear on or inwardly of ends 18, 19 since the threaded area of the nut extends outwardly of the taper. When the tension is lessened, as when the turnbuckle is disassembled, this outward force is lessened, reducing the gripping force and permitting the nut to be disengaged from the turnbuckle in the normal manner. Of course, in some instances it is possible to use nuts having walls of sufficient thickness and made of a type of metal that this outward movement becomes negligible.

The internal threaded nut receiving surfaces of the turnbuckle extend almost to the center so as to provide for a minimum threaded area of engagement between the nuts and turnbuckle when the nuts are moved inwardly for adjustment. The central unthreaded surface area 42 has a diameter equal to that of the major thread diameter so that the nut threads at the end of the nut will not jam or lock if moved inwardly too much. It should also be noted that the inner edge of flats 26, 27 are shouldered at a distance from the inner threaded ends of the nuts 12, 13 equal to the distance from the outer ends of the barrel to the approximate center of the unthreaded surface area. Thus, in tightening the nut when the wrench used abuts the end of the turnbuckle the operator knows that the inner rotational limit has been reached.

Figure 3:
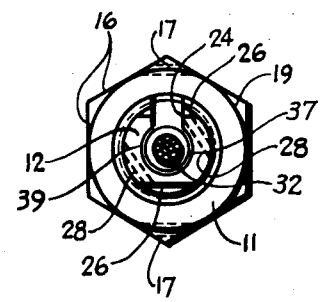
Figure 3 is an end view taken along the line 3—3 of Figure 2.

Figure 3 is an end view of the assembly taken along the line 3—3 of Figure 1. Here slot 24 is shown to be smaller in width than the smaller inner bore surface 39. This slot determines the maximum diameter of the cable or rod with which this turnbuckle is intended to be used. This further insures that the cable itself will be the weakest link in the connection and that the turnbuckle used will have the necessary strength. If the cable will not pass through the slot, the operator knows he is attempting to install the wrong turnbuckle and is prompted to use a larger one meant for that particular use. Making the slot 24 of a width as small as possible also provides for greater structural strength of the nut. It is further noted that flats 26 are at right angles to the slot 24. Thus, inward pressure on the flats, as by pliers or other devices, will not tend to close the slot or cause a structural weakness due to excessive pressure applied. The safety wire apertures 28 angle outwardly from flats 26 to permit passage of the safety wire without interfering with the cable.

Turnbuckles made in accordance with this invention made of light weight soft metal, such as aluminum for example, have the necessary strength to meet rigid standards. Their length is less than one-half as long and are about one-fourth the weight of comparable known turnbuckles performing the same functions.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A turnbuckle comprising a barrel with an internal threaded inner surface, approximately one-half of which is threaded in an opposite direction to that of the other half, a pair of nuts having external threads thereon engageable with said threaded inner surface, said external threads extending from the inner end of said nut along its outer surface a predetermined minimum length, said nuts having flats on their outer ends for rotation thereby with leverage means engaging said flats, said flats having shoulders thereon spaced from the inner end of said nut a distance substantially equal to one-half the length of said barrel to thereby cause leverage means on said flats to abut the end of said barrel when said nut has been inserted a predetermined limit, an inspection aperture in said barrel spaced from its end a distance equal to the length of said nut threaded surface whereby determination of minimum threaded engagement between said nut and said barrel may be made by passage of said nut under said inspection aperture and by disappearance of said nut threaded surface from view.

2. A turnbuckle for engagement with a ball ended cable after said cable has been placed in operating position, said turnbuckle comprising a barrel with an internal threaded inner surface, approximately one-half of which is threaded in an opposite direction to that of the other half, said barrel having an enlarged reinforcing portion extending circumferentially around the ends thereof, a pair of nuts having external threads thereon engageable with said threaded inner surface, said nuts each having a longitudinal slot therein of width sufficient to receive said cable, said nuts each having a longitudinal bore having a first portion of larger diameter than said slot and extending inwardly from the inner end of said nut a predetermined distance to receive the ball ended portion on said cable to prevent withdrawal of said cable, said predetermined distance being less than the length of the externally threaded area on said nut, said first portion having an inwardly tapered shoulder opposing outward movement of said ball and urging outward expansion of said nut into tighter threaded relation with said barrel inwardly of said enlarged reinforcing portion thereon.

3. A turnbuckle for engagement with a ball ended cable after said cable has been placed in operating position, said turnbuckle comprising a barrel with an internal threaded inner surface, approximately one-half of which is threaded in an opposite direction to that of the other half, a pair of nuts having external threads thereon engageable with said threaded inner surface, said nuts each having a longitudinal slot therein of width sufficient to receive said cable, said nut having an internal longitudinal bore extending between the ends thereof, said bore having a first portion and a second portion of different diameters, said cable having a ball and sleeve attached to the end thereof, said first portion having a diameter of sufficient size to receive said ball, said second portion having a diameter of sufficient size to receive said sleeve, said ball and sleeve being of sufficient size relative to said diameters as to oppose any force tending to collapse the walls of said nut, a tapered shoulder interconnecting said bore portions to prevent longitudinal withdrawal of said ball and cable, flats on the outer end of said nut for rotation thereby with leverage means engaging said flats, said flats being at right angles to the walls of said slot to prevent possible structural failure in rotation of said nut.

4. A turnbuckle for connecting cables with ball ends thereon, said turnbuckle comprising a barrel and cable engaging nuts, said nuts each having external threads from the inner end extending a predetermined distance along the outer surface thereof, a central longitudinal bore extending between the ends thereof, said bore having a first portion of a diameter sufficient to receive said ball end and a second portion of smaller diameter to receive said cable and prevent longitudinal withdrawal of said ball end, a tapered shoulder interconnecting said portions, said shoulder being a shorter distance from said inner end than the length of said threaded surface, an elongated longitudinal slot interconnecting said bore with the outer surface of said nut and of sufficient width to permit said nut to be inserted over said cable, said nut having flats on the outer end thereof at right angles to the walls of said slot, said flats having shoulders spaced from said inner end of said nut so as to be aligned with the end of said barrel upon maximum desired penetration of said nut into said barrel, safety wire apertures passing through said flats for positioning safety wire on said flats after assembly, said barrel comprising a cylindrical outer surface with circumferential raised portions at the ends thereof and circumferentially spaced flats at the midsection thereof, safety wire apertures interconnecting adjacent flats, inspection apertures extending through the wall of said barrel at a distance from said ends equal to the length of said threaded portion of said nut, said barrel having an internal threaded surface for receiving said threaded nut portion, said barrel and said nuts upon relative rotation being operable to move said nuts longitudinally into and out of said barrel.

References Cited in the file of this patent

UNITED STATES PATENTS

| | | |
|---|---|---|
| 1,223,546 | Williams | Apr. 24, 1917 |
| 1,973,322 | Staples | Sept. 11, 1934 |
| 2,064,440 | Meeker | Dec. 15, 1936 |
| 2,509,272 | Karnuth et al. | May 30, 1950 |
| 2,738,998 | Haupt | Mar. 20, 1956 |

FOREIGN PATENTS

| | | |
|---|---|---|
| 755,350 | Great Britain | Aug. 22, 1956 |